US012780460B2

(12) United States Patent
Straus et al.

(10) Patent No.: US 12,780,460 B2
(45) Date of Patent: Nov. 3, 2026

(54) PRODUCTS, SYSTEMS, AND METHODS FOR AN AUTONOMOUS DRONE DOCKING STATION

(71) Applicant: Airscort, Ltd., Har-Tuv B (IL)

(72) Inventors: Itai Straus, Moshav Ora (IL); Yitzhak Tal, Givataim (IL); Shimon Yisraelian, Nes Ziona (IL)

(73) Assignee: AIRSCORT, LTD., Har-Tuv B (IL)

(*) Notice: Subject to any disclaimer, the term of this patent is extended or adjusted under 35 U.S.C. 154(b) by 791 days.

(21) Appl. No.: 18/170,432

(22) Filed: Feb. 16, 2023

(65) Prior Publication Data

US 2023/0257139 A1 Aug. 17, 2023

Related U.S. Application Data

(60) Provisional application No. 63/311,332, filed on Feb. 17, 2022.

(51) Int. Cl.

| | |
|---|---|
| ***B64U 70/95*** | (2023.01) |
| ***B60L 53/80*** | (2019.01) |
| ***B60L 58/10*** | (2019.01) |
| ***B64D 45/00*** | (2006.01) |
| ***B64U 50/39*** | (2023.01) |
| ***B64U 80/25*** | (2023.01) |
| ***G06F 8/35*** | (2018.01) |

(52) U.S. Cl.

CPC .............. *B64U 70/95* (2023.01); *B60L 53/80* (2019.02); *B60L 58/10* (2019.02); *B64D 45/00* (2013.01);

(Continued)

(58) Field of Classification Search

CPC ........ B64U 70/95; B64U 50/39; B64U 80/25; B64U 10/13; B64U 50/19; B64U 50/34;

(Continued)

(56) References Cited

U.S. PATENT DOCUMENTS

| | | | | |
|---|---|---|---|---|
| 2015/0127209 A1 | 5/2015 | Abdelrahman | | |
| 2016/0039542 A1* | 2/2016 | Wang | B64U 50/37 | |
| | | | 244/114 R | |

(Continued)

FOREIGN PATENT DOCUMENTS

| | | | | |
|---|---|---|---|---|
| AU | 2019213466 A1 | 9/2020 | | |
| WO | WO-2020181329 A1 * | 9/2020 | | B64F 1/362 |
| WO | 2023156944 A2 | 8/2023 | | |

OTHER PUBLICATIONS

International Search Report and Written Opinion issued for Application PCT/IB2023/051430; 20 pages; dated Aug. 28, 2023.

(Continued)

*Primary Examiner* — David V Henze

(74) *Attorney, Agent, or Firm* — Gray Ice Higdon

(57) ABSTRACT

Various embodiments of a docking station configured for semi-autonomous or fully autonomous management of drones. In various embodiments, the station can identify the exact location and angle of a drone on a landing pad, and modify the location and angle in order for a robot to retrieve a used battery from the drone and also insert a fully charged replacement battery. The station may also determine the charge status of a drone's battery, the exact type of battery used by a particular drone, and select for replacement into the drone the specific battery needed. There are various embodiments of a system with such a docking station, command & control software, a database, and a network control center. Various embodiments are of methods to identify the need to replace a battery, identify the type of battery required, and effect replacement in an automated manner.

10 Claims, 7 Drawing Sheets

(52) U.S. Cl.
CPC ............. *B64U 50/39* (2023.01); *B64U 80/25* (2023.01); *B64D 2045/0085* (2013.01); *G06F 8/35* (2013.01)

(58) Field of Classification Search
CPC .......... B60L 53/80; B60L 53/68; B60L 53/36; B60L 58/10; B60L 2200/10; B64D 45/00; B64D 2045/0085; B64C 39/024; B64F 1/007
See application file for complete search history.

(56) References Cited

U.S. PATENT DOCUMENTS

| | | | | |
|---|---|---|---|---|
| 2016/0270148 | A1* | 9/2016 | Filipovic | H05B 47/19 |
| 2017/0088288 | A1 | 3/2017 | Wang | |
| 2017/0096075 | A1* | 4/2017 | Henry | B60L 53/80 |
| 2018/0141680 | A1 | 5/2018 | Heinonen | |
| 2018/0312069 | A1* | 11/2018 | McClymond | B64U 50/39 |
| 2018/0327091 | A1 | 11/2018 | Burks et al. | |
| 2019/0002127 | A1 | 1/2019 | Straus et al. | |
| 2020/0410872 | A1 | 12/2020 | Speasl et al. | |
| 2021/0197982 | A1 | 7/2021 | Foggia | |
| 2021/0284335 | A1* | 9/2021 | Mclaughlin | B64F 1/362 |
| 2021/0380019 | A1* | 12/2021 | Livingston | B64U 50/39 |
| 2022/0055770 | A1* | 2/2022 | O'Toole | B65G 69/003 |

OTHER PUBLICATIONS

European Patent Office, Extended European Search Report issued in Application No. 23755990.1, 15 pages, dated Jun. 10, 2026.
European Patent Office, Partial European Search Report issued in Application No. 23755990.1, 20 pages, dated Jul. 6, 2026.

* cited by examiner

PRODUCTS, SYSTEMS, AND METHODS FOR AN AUTONOMOUS DRONE DOCKING STATION

CROSS-REFERENCE TO RELATED APPLICATIONS

This non-provisional application claims priority to, and hereby incorporates in its entirety, provisional patent application 63/311,332, filed Feb. 17, 2022, entitled, “Products, Systems, and Methods for an Autonomous Drone Docking Station”.

TECHNICAL FIELD

Some of the embodiments herein describe products, systems, and methods for identifying a need for replacement or recharge of batteries for drones. Some of the embodiments describe products, systems, and methods for replacing or recharging the specific batteries required by specific drones. Some of the embodiments involve products, systems, and methods related to the management of individual drones, or of drone fleets, by or with drone docking stations that work either autonomously, semi-autonomously, manually or under a command & control center.

BACKGROUND

Drones can stay airborne and on mission for only 20-30 minutes between battery charges. In the absence of autonomous launching, landing, battery-swap, and recharging, drones have been required to rely heavily on human operators. The involvement of humans, in comparison to automation, is relatively slow, relatively expensive, and prone to errors. In addition, long charge periods enlarge the time gap between flights, and reduce the periods of time the drone devote to fulfilling their missions.

What is needed is fast and reliable autonomous drone solutions for each or all of launch, land, and recharge, either minimizing or completely removing the need for human operators. Such solutions would maximize the ability of drones to complete missions, increase service time on mission, and minimize the costs of doing so.

SUMMARY

Various embodiments described enable complete and remote mission autonomy for a variety of drones, and for different flight control applications. There is no need for a human operator, whether as a pilot for a drone in flight, or for landing, battery recharge, or launch. Various benefits are extended range and enhanced time on target, reliable docking, auto-battery swap, auto-deployment, and 24/7 field readiness. In some embodiments, a docking station autonomously identifies the battery needed for a particular drone, and uses a robotic arm to replace the battery of the drone with freshly charged battery, thus reducing the drone’s time in the docking station and maximizing the time available for mission activity.

One embodiment is a drone docking station that allows for battery replacement, safe precision landing, secure and all-weather storage, remote operations, field readiness and auto response for various drone types with minimal to zero modifications required to the drone.

One embodiment is a computer vision mechanism that can find the drone, identify the battery needed, and replace the battery regardless of the landing position and location within the station.

One embodiment is a robotic arm on the docking station that can be adapted for various drone types, in order to replace a wide variety of drone batteries.

One embodiment is an interchangeable robotic arm that can adapt itself according to the drone that requires servicing.

One embodiment is a scalable design of a docking station that allows for a plurality of drones to utilize the same docking station, regardless of type of size of different drones.

One embodiment is a system with open application programing interface (“API”) to enable easy integration with different control software vendors.

One embodiment is a method for autonomous off-station wireless charge of a drone, with no need for either landing or launch.

One embodiment is a method for autonomous on-station replacement of a drone battery, in which a system identifies a drone, identifies the type and size of a battery needed for such drone, and replaces the drone battery while the drone is docked on the docking station.

One embodiment is a power distribution unit that has been modified to monitor, on a consistent basis, the state of the electrical system and the operational health, including measurements of both voltage and current of the electrical system and batteries. In the event of any electrical failure or deficiency, said unit activates one or more back-up batteries for purposes of alarm, drone landing, drone launch, and system operation.

One embodiment is a method for capturing and using camera images of a drone to determine the external health of a drone, and report to a command & control center.

One embodiment is a method by which a docking station may identify external threats such as theft, vandalism, animals, insects, and hacking. In some embodiments, the station may use protective measures to counter the threat. Other embodiments describe products and systems for implementing such methods.

In all configurations illustrated herein, operation may be entirely autonomous, or with human operators at a network command & control center, or with both autonomous and human operators depending on the circumstances. Further, although many of the figures show only one drone, it is understood that a system may include two or more drones, serviced by a docking station either serially in or in parallel.

DETAILED DESCRIPTION

Figure 1:
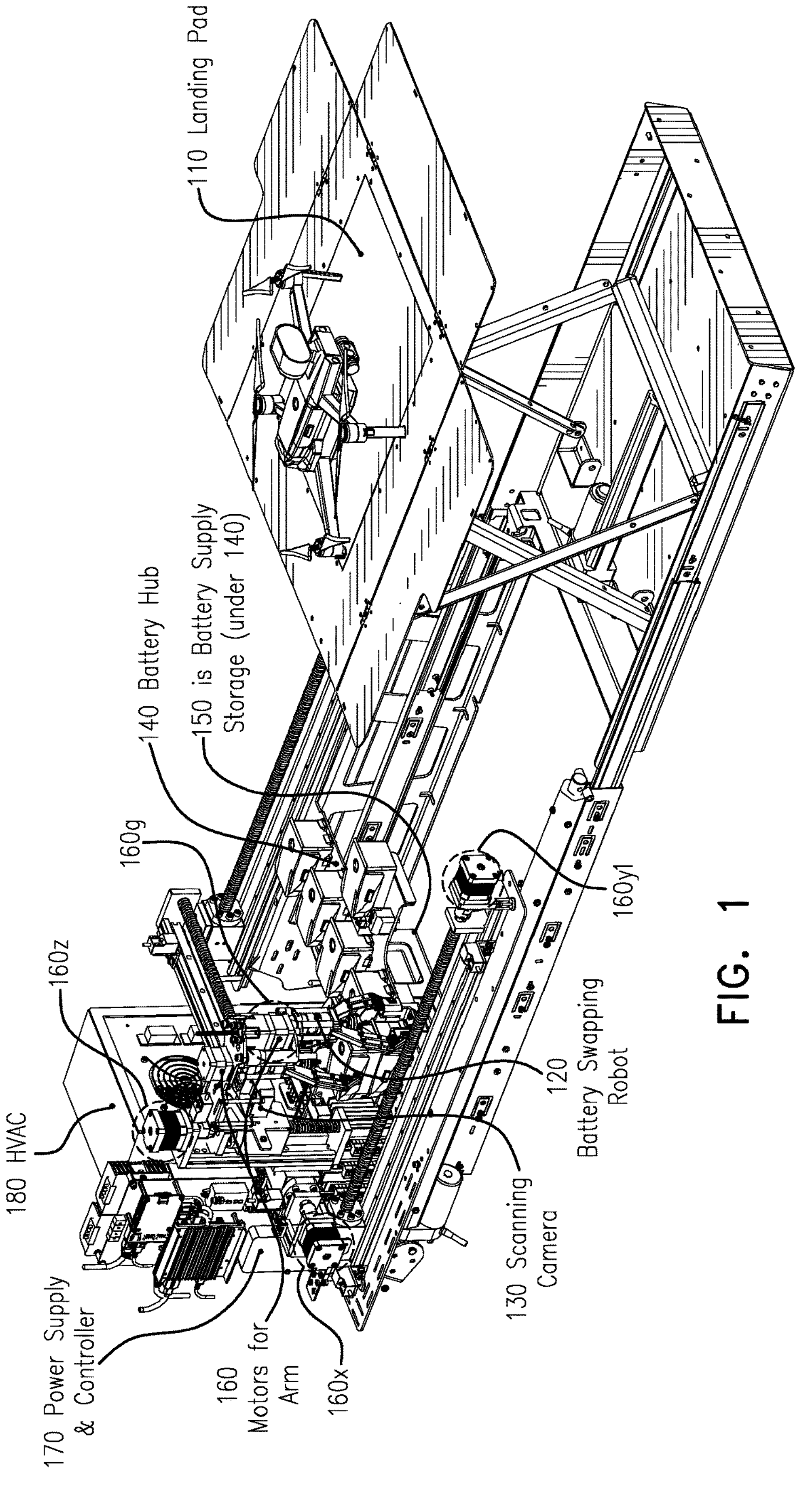
FIG. 1 is a diagram of the internal components of a docking station for drones that may operate in an autonomous fashion, identifying the need for battery replacement and the type of battery required, then effecting the replacement. The diagram shows the station in an open state, with landing pad extended and uplifted.

One exemplary embodiment is a docking station with various components that enable autonomous management of replacing a battery in a drone. FIG. 1 is a cutaway view of docking station, viewing the station from the right-hand side. The station includes a landing pad 110, which is used both to land incoming drones and to launch outgoing drones. The landing pad 110 may be extended out for easy landing and launch free of any possible obstacles internal to the station. In FIG. 1, the landing pad 110 has been extended, and a drone has landed. The drone shown is not part of the embodiment as illustrated, because the docking station can work with many kinds of drones by many different manufacturers or operators. In alternative embodiments, a drone may be part of a system involving the docking station, but that is not what is illustrated in FIG. 1.

The drone servicing is handled by a battery swapping robot 120. This robot 120 includes an arm shown and discussed in FIG. 3. The robot 120, with its arm, are guided by a scanning camera 130 that scans the area of the landing pad 110, and determines the exact location of the drone on the pad 110, including coordinates on the x-y plane, plus the angle of the drone relative to arm of the robot 120. The docking station knows what kind of drone is on the landing pad 110, in particular the size and type of the drone's battery. That is determined by wireless communicative contact between the drone and the station prior to the landing of the drone on the pad 110. With this knowledge, either prior to the landing of drone, or immediately upon landing, the station will prepare a fully charged battery for placement in the drone. In one embodiment, the battery is charged in the battery hub 140, and then taken by the robot 120 to be placed into the drone. In another embodiment, the battery has been pre-charged, prior to landing, and has been placed in a battery supply storage 150. In some embodiments, the battery supply 150 is located in close proximity to the battery hub 140 so that charging in the hub 140 to placement in storage 150 is easy and fast, or grasping from storage 150 to the robot 120 is easy and fast. The robot 120 including all operations of its arm are powered by several motors 160 dedicated to that task. All power for the station comes from a power supply & controller 170 in the station. The power may be supplied externally by any source, including electricity, an external battery of some sort, a solar panel on or near the station, or any other source. The operation of the docking station may generate significant heat, which is dissipated by cooling from an HVAC sub-system 180. If the docking station is operating in a relatively cold environment, the HVAC sub-system 180 may be used for heating rather than cooling.

In some embodiments, the battery supply storage 150 holds, in addition to one or more charged drone batteries of various sizes and types, a charged back-up battery for the drone station. In the event of power failure from the external source, whether that source is electricity or an external battery, the internal back-up battery in the storage area 150 will operate to manipulate the functions of the station, including extending or retracting the landing pad 110, uplifting or down lifting the landing pad 110, landing of the drone, manipulating the robot 120 arm and its grasper, and opening or closing the enclosure of the station. In alternative embodiments, a back-up battery is not located as storage area 150, but rather elsewhere in the docking station.

In some embodiments, the station includes a locking mechanism for the robotic arm of the battery switching robot 120. This mechanism may be locked, thereby holding the robotic arm in place, during shipment of the docking station or during any movement be it by car, by boat, by carrying, or other. The locking is intended to prevent wear & tear or damage to the robotic arm. Before the station is moved, a command is given to the locking mechanism to go into locked mode. That command may be issued by a human operator, or by either the drone or a command & control center 660 according to protocols previously programmed into the system. There are various ways in which the locking mechanism may operate, such as gripping a strong bracket, or placing a small joint into an indentation in the floor of the station, or placing small obstacles at the front and back of the robotic arm, or other. Once the lock has been placed, it can open only with electric power; if the power is off, the lock will not open.

FIG. 1 shows a docking station with a sole landing pad 110. In alternative embodiments, the docking stations may have two or more landing pads, which may be located one beside the other moving from left to right, or one behind the other moving from front to back. In various embodiments, the two or more landing pads may be serviced by a single robot with arm 120, scanning camera 130, battery hub 140, battery supply storage 150, motors for arm 160, power supply & controller 170, and HVAC sub-system 180.

Figure 2:
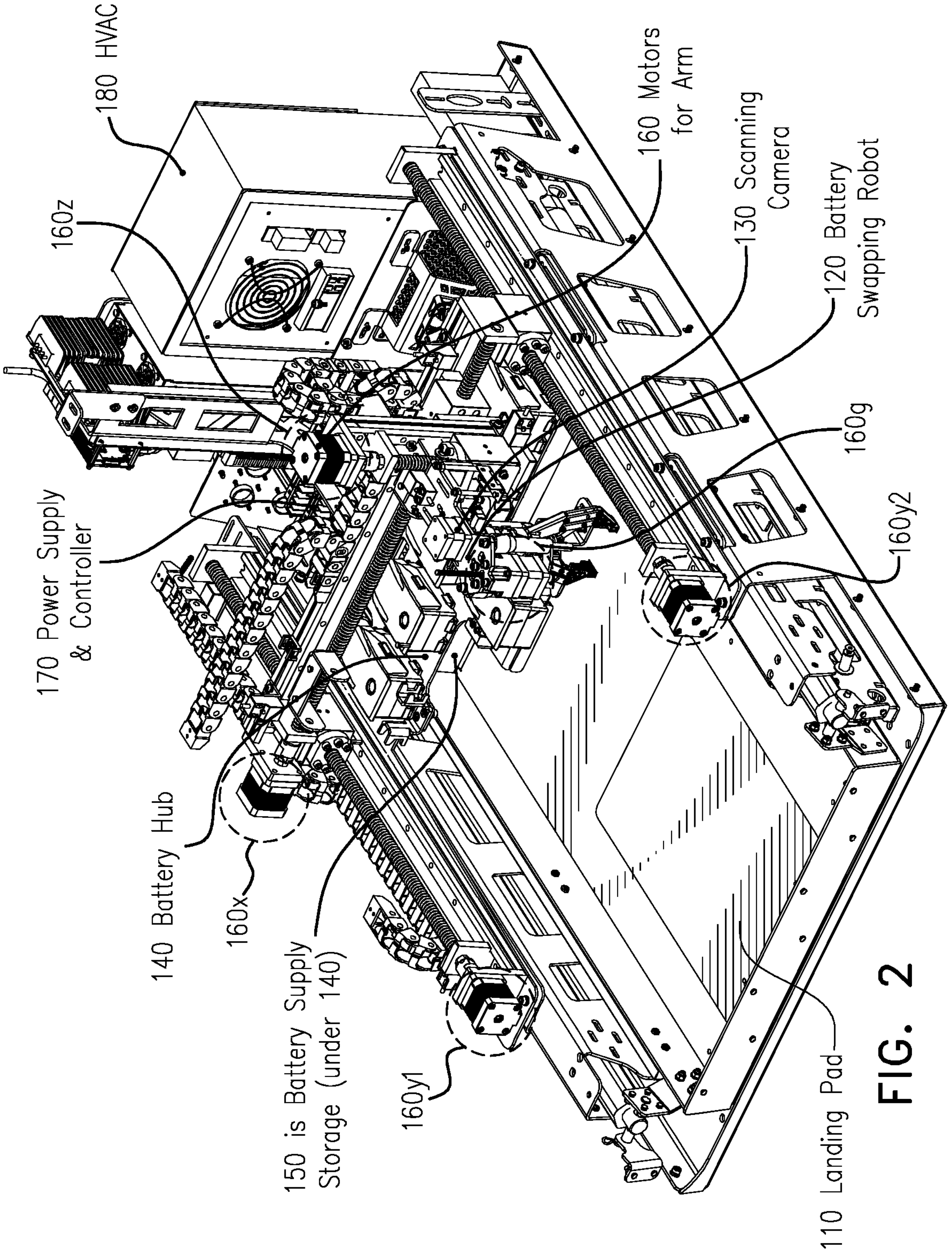
FIG. 2 is a diagram of the same docking station, but from a different angle, with the enclosing lid and the landing pad in the retracted position.
Figure 3:
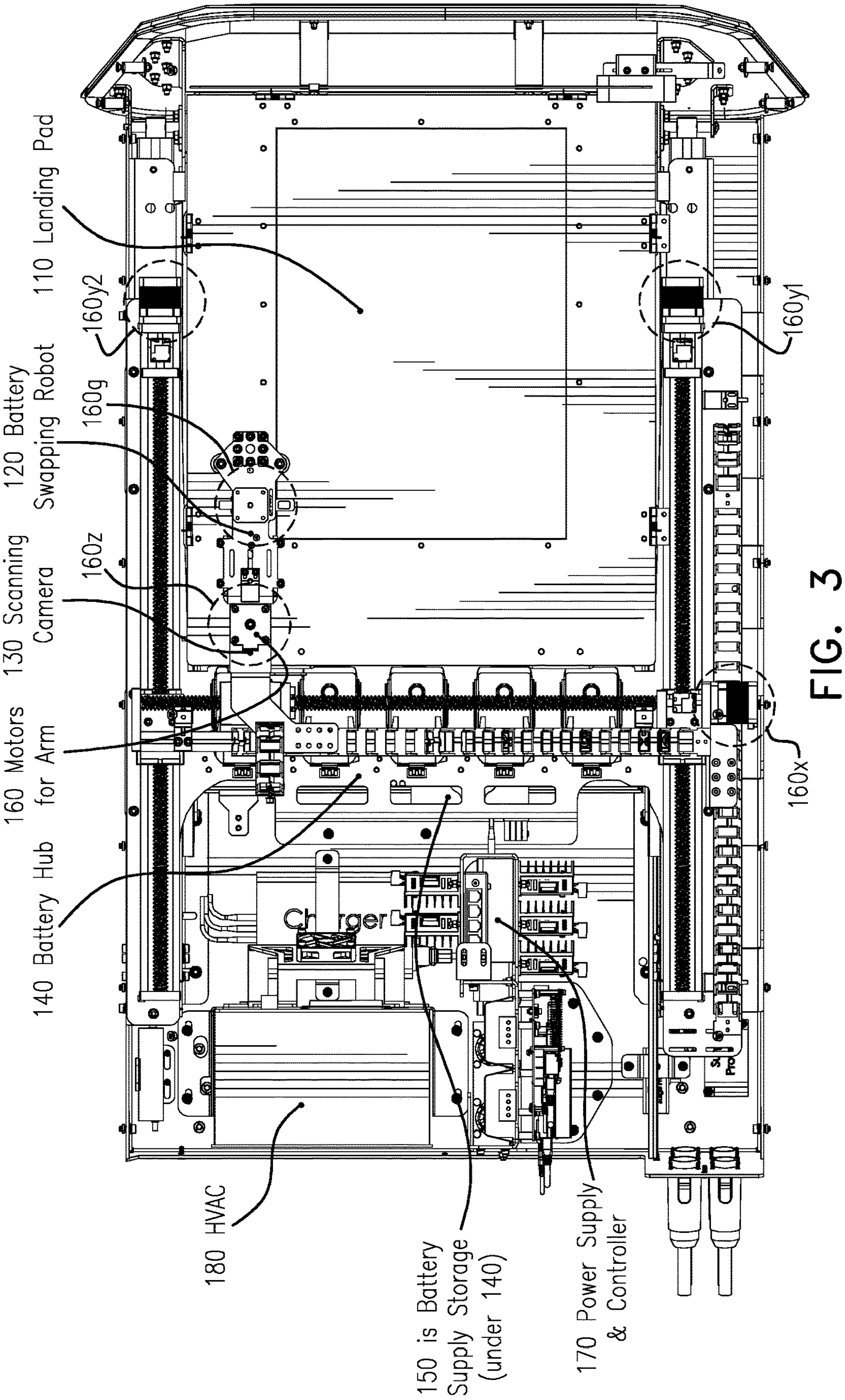
FIG. 3 is a diagram of the same docking station from a top down view.

In the particular embodiment shown in FIG. 1, also in FIGS. 2 and 3, there are five motors, which perform various functions. Motor 160*y*1, shown in all of FIGS. 1, 2, and 3, and motor 160*y*2, shown in FIGS. 2 and 3 but hidden from view by landing pad 110 in FIG. 1, move the robotic arm on the y-axis, which is the axis from the back of the docking station to the front, and is in essence extending the robotic arm out or contracting it in. Motor 160*x* moves the robotic arm on the x-axis, which is the axis from one side of the docking station to the other. Motor 160*z* moves the robotic arm on the z-axis, meaning up and down. All of these motions on the x, y, and z, axes are intended to orient the robotic arm to the landed drone such that the gasper of the robotic arm will be able to approach the drone, make contact with the drone, turn off the drone's power, change its location or orientation if required, and change its battery. Motor 160*g* is a general motor not related to the axes, that can rotate the grasper on the robotic arm to any degree necessary for the grasper to grasp the drone's used battery, to take it out of the drone, and to place into the drone a fully charged battery.

The configuration of motors illustrated in FIGS. 1, 2, and 3, is only one of many possible embodiments. In other embodiments, the motors may be located in different parts of the docking station, for example they may be co-located in one place; or for example only the x, y, and z motors may be co-located with the g motor located in proximity to the grasper. In other embodiments, there may be only one motor for the y-axis, 160*y*1, and 160*y*2 may not appear at all. In other embodiments, there may be additional motors for any of the x-axis, the z-axis, or the g motor. In other embodiments, multiple movements may be combined in one motor. For example, there could be one motor for all of the x, y, z, and g, movement. Alternatively, there could be one motor for the x, y, and z-axes movements, and a separate g motor to regulate the grasper. If there are multiple gaspers, a single 160*g* motor may control all the graspers, or there may be a different motor for each grasper. Similarly, the embodiments shown in FIGS. 1, 2, and 3, include a single robotic arm with a single grasper for the arm. There may be multiple graspers on the one robotic arm, controlled by either one or several g motors.

FIGS. 1, 2, and 3, show a single landing pad for landing a single drone, serviced by a single robotic arm. In alternative embodiments, the landing pad is sufficiently large that it can land two or more drones, which may be service by one robotic arm or several robotic arms, each arm having one or more graspers, with one or more g motors controlling the rotational movement of the graspers. In yet other alternative embodiments, there may be two or more landing pads, configured parallel on the x-axis, or seriatim (one behind the other) on the y-axis, or in some other configuration, each landing pad servicing one or more drones, serviced by one or more robotic arms for the landing pads, where each arm has one or more graspers at its end.

FIG. 2 is the same docking station, with the same elements, but from a cutaway left side view. Here in FIG. 2, the power supply & controller 170 is not visible, but conversely the battery supply storage 150 under the battery hub 140 is easily visible.

FIG. 3 is the same docking station, with the same elements, but with a few differences that are easily visible for the angle of the view. Here in FIG. 3, the landing pad 110 has not been extended outward, but is rather inside the docking station, and the docking station is closed. In FIG. 3, the battery swapping robot 120 is clearly visible, with the head of the robot 120 extended toward the front of the station (where the HVAC 180 is located at the back of the station). Also in FIG. 3, the battery hub 140 is clearly visible, and it is possible to see the battery supply storage 150 under the battery hub 140. In FIGS. 1-3, the battery hub 140 and the storage 150 are in close proximity so there is also a physical closeness of the functions of charging, storage, and interaction with the robot 120 brining used batteries into the battery hub 140 or taking charged batteries from the battery hub 140 to a drone on the landing pad 110. However, in other embodiments, there may be physical distance between any of the robot 120, the battery hub 140, and battery supply storage 150.

Figure 4:
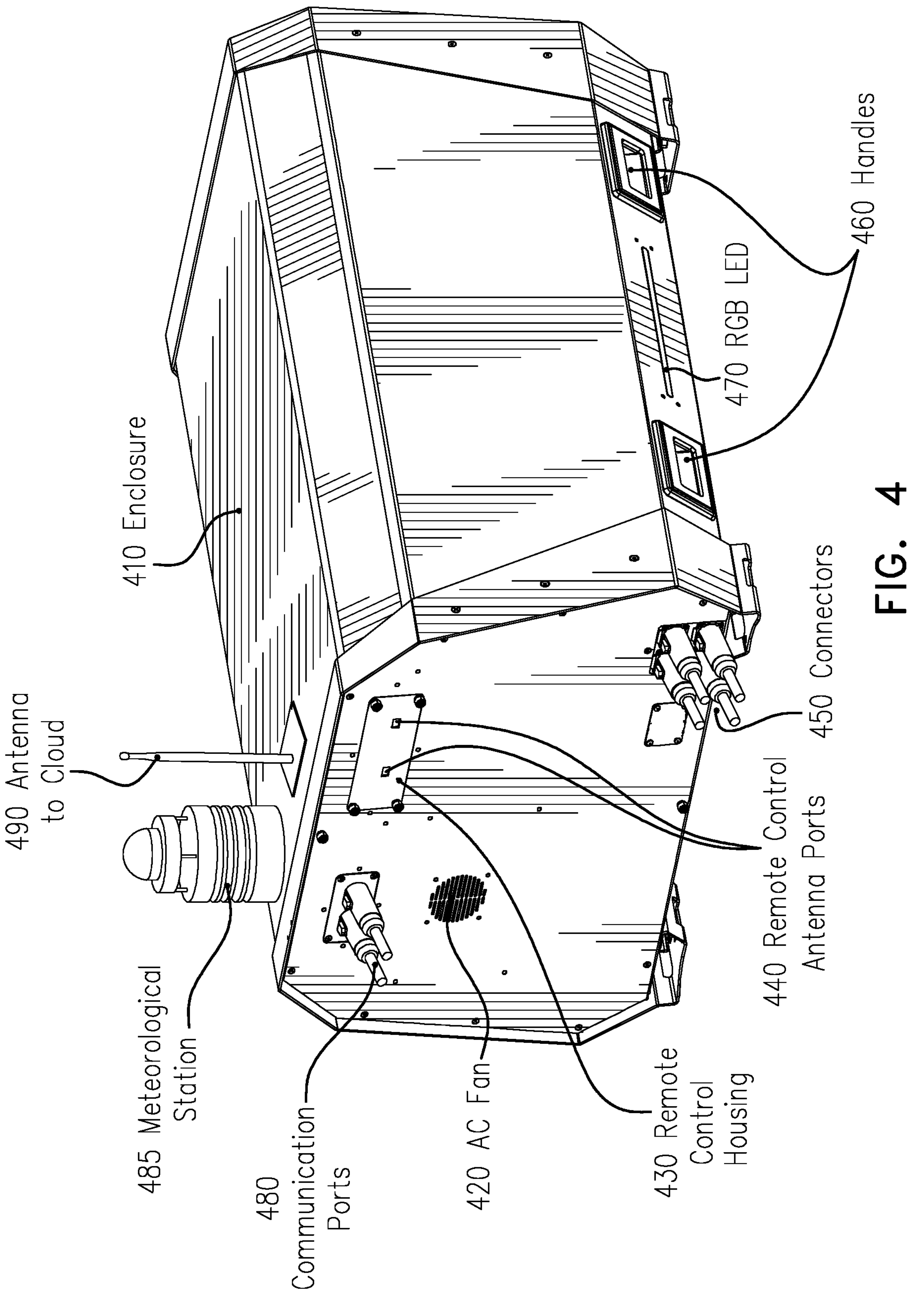
FIG. 4 is a diagram of a docking station in a closed position, including multiple additions for communication with drones or with a control center, and various features for handling the docking station.

FIG. 4 is a diagram of a docking station 410 in a closed position, including multiple additions for communication with drones or with a control center, and various features for handling the docking station. The enclosure 410 is closed, as in FIG. 3 but unlike FIGS. 1-2. When it is closed, the HVAC system will frequently operate in conjunction with the outlet for an AC fan 420 located on the skin of the station 410. Here the AC fan 420 is located at the back of station 410, but in other embodiments it may be located on the sides, the front, or the top. The station 410 is in wireless communication with one or more drones. To achieve that, there is within the station, a transceiver located in a remote controller housing 430. Also visible are remote control antenna ports 440. Here are there are two ports, which mean that there may be either one or two antennas, one for each port. There is no limit to the number of ports possible, except that each antenna must be attached to the station through a port. There are a variety of reasons why multiple antennas rather than one might be used, including (1) the antennas may come from a manufacturer together with one or more drones; (2) the station may be in communicative contact with two or more drones at the same time, conveying instructions to the drones, or receiving reports from the drone, or preparing to land; (3) the antennas may transmit at different frequencies to increase the quality of communication; (4) the antennas may operate by different air protocols such as FDM or TDM or CDM; or (5) each antenna can back-up the other if the first antenna fails for any reason.

There are various connectors 450 that allow the station to interact with the outside world. Here, in 450, four connectors are shown, but any number may be offered in a docking station. There may be many functions for these connectors, such as, but not limited to, (1) receipt of A/C power typically electricity from an external source; (2) receipt of DC power from a battery such as a standalone batter or a car battery; (3) receipt of DC power from a power generating source such as a solar panel which might be located on the enclosure 410 of the station or remotely from the station; (4) USB internet connection; or (5) Ethernet internet connection.

The handles 460 allow for easy transport of the station. There may be a light for any of multiple purposes. Here, for example, there is illustrated an LED 470 in the visible spectrum RGB, but LED 470 is only one example of a type of light which may neon, incandescent, or other, and the light may be visible, or infrared, or ultraviolet, or something else. Possible purposes of the light are (1) to indicate when the station has power on or off, or (2) to indicate readiness of the station for some action such as landing or launching, or (3) to indicate or convey a warning of some problem in the station.

Figure 5:
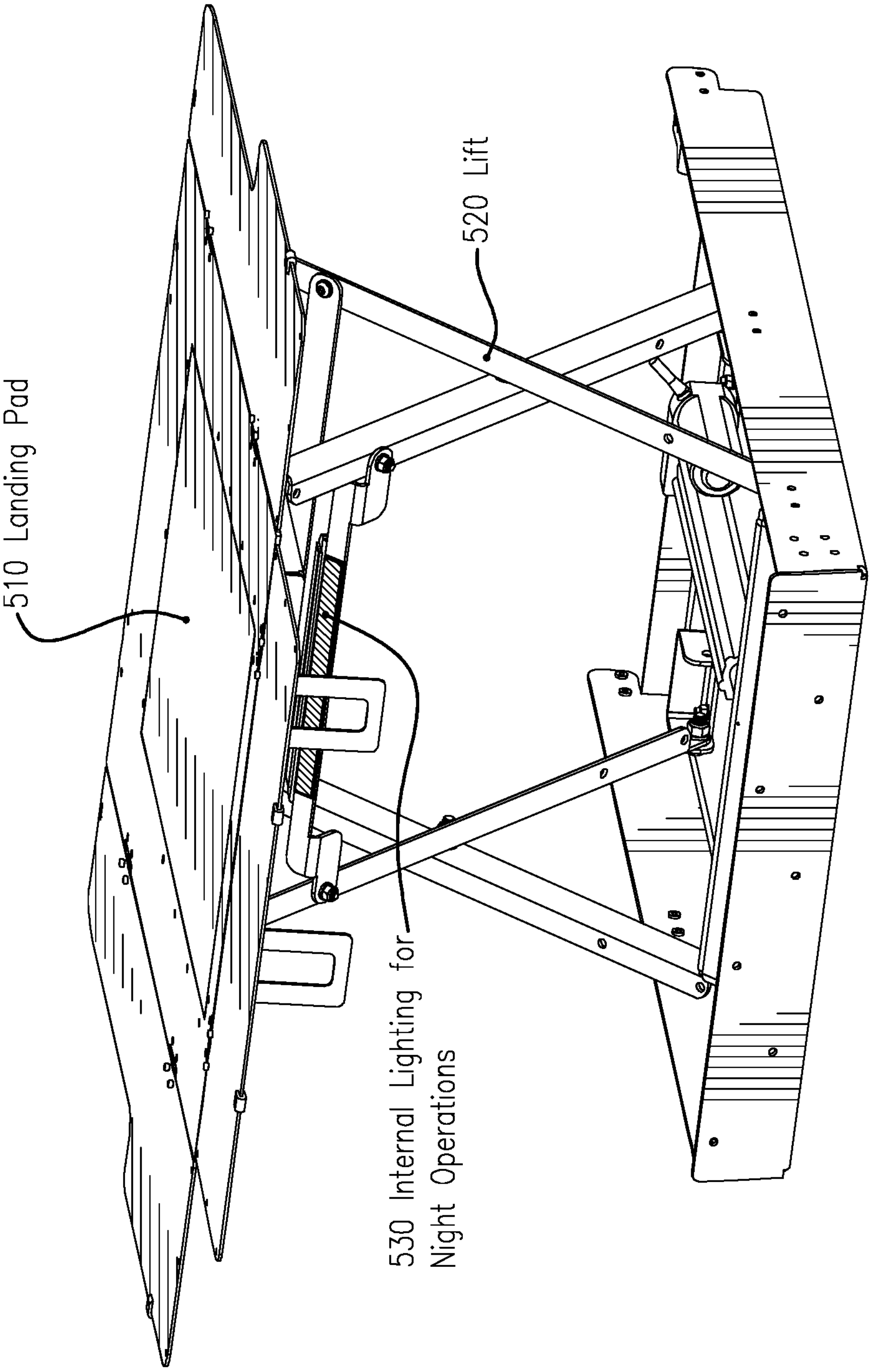
FIG. 5 is a diagram of a drone landing pad that may be extended up or contracted down for the landing or launching of drones.

There may be communication ports on the docking station 480. Here, two such ports 480 are shown, and they could connect to a meteorological station 485 and/or antenna to cloud 490 on the enclosure 410. The meteorological station may measure any number of conditions in the atmosphere, including, but not limited to, snow, rain, moisture of any kind, temperature, wind direction and speed, or barometric pressure. Any of these might impact either the landing and launching operations of drones, or the possible safety of the station. As just one example, in conditions of extreme heat and low air pressure, flying becomes more difficult in accordance with the Bernoulli Principle, and hence some drone operations may be impacted. Data received by the meteorological station 485 through the communication ports 480 to the station where it is processed or sent to an external controller as illustrated in FIG. 5.

FIG. 4 also shows an antenna to cloud 490. This antenna is communicatively connected, wirelessly, with a remote controller, as shown in FIG. 5 and discussed below. This antenna 490 may be connected to the station through one of the communication ports 480.

In various embodiments, there are additional external elements, beyond the connectors 450, communication ports 480, meteorological station 485 and antenna to cloud 490. This includes, for example, an external camera that may inspect the outer skin of the enclosure 410 and also the area outside the station to identity damage to the station, or a condition threatening to safety, or a possible threat of theft. The external camera is communicatively connected to the station, and the camera communicates in real time to the station. If any such threat is identified, the station may take protective action such as communicating with the command & control center 660, or emitting a warning sound, or emitting a loud sound to scare away animals or would be thieves, or emitting a scent repulsive to insects or animals or persons, or any other defensive measures.

In various embodiments, the drone may be surrounded by, or encompassed in part, by a fence or other physical structure that blocks or diverts strong wind. If the docking station is itself on a platform, the fence or other structure may also be on the platform. Even if there is no such platform, nevertheless the fence or other structure may be constructed near the docking station as part of the system.

In various embodiments, the docking station in a physical stand or other platform that raises the docking station off the ground. This may reduce the threat from animals, ground moisture, and ground insects. This stand or other platform could include a fence or other physical structure against wind, as just discussed.

In some embodiments, the physical structure of the docking station may be easily assembled or disassemble from 2, or 3, or some other number of pieces that may be easily fitted together by shape, or snap, or Velcro®, or some other means of non-permanent assembly. As just one of many possible examples, the docking station may be disassembled into the electronics, and the launching pad with enclosure. Or the enclosure may be part of the electronics. Or there may be three parts, with the launching pad and its enclosure on the ground, the electronics and their enclosure on the ground, and the upper enclosure that closes around the electronics and launching pad. The ability to disassemble the docking station into multiple parts makes it easy to transport without increasing the setup time to any significant degree.

FIG. 5 is a diagram of a drone landing pad 510 that may be extended up or contracted down for the landing or launching of drones. Here there is a lift 520 that may be extended upward as a drone lands, or as drone is to be launched, or that may be retracted downward after landing or post-launch. The higher position for active operation of a drone is to avoid any possible obstacles or collision with components within the docking station. This is particularly important for larger drones whose lengths may be comparable to the length of the landing pad 510. There is also internal lighting for operations at night 530, or during inclement weather, where visual contact between the drone and the station is less than ideal. The lighting may be in the RGB range, or UV, or IR, or any other part of the visual spectrum.

1. Some Embodiments

One embodiment is a docking station 610 configured for semi or fully autonomous management of drones. In some embodiment, the station includes a robot 120 with robotic arm that is capable of swapping batteries in a drone, in which the robot 120 is configured to move within the station on the x-y-z axes. The head of the robot 120 is configured to make contact with the drone, to lift out the battery within the drone, and to place into the drone a substitute battery of the same electro-mechanical properties as the old (switched out) battery, such that new battery will fit securely within the drone and perform the same battery function as the old battery. In some embodiments, the landing pad 110 is attached to a lift 520 that may lift the pad 110 higher than the rest of the docking station to avoid, at the moment of landing or launch, possible obstacles within the docking station. In some embodiments, the landing pad 110 has attached internal lighting for night operations 530. Such lighting 530 may be in the visible RGB spectrum, or IR, or UV, or any other that may be seen by a drone and that may guide a drone's landing particularly inclement weather with difficult visual conditions.

Some embodiments include a device for capturing and processing images. This may be a camera, 130 or any other optical device that includes software for processing images captured. The device is capable of imaging a drone on a landing pad 110, and then determining the drone's exact location on the pad 110, as well the angle of the drone relative to the arm of the robot 120. By guiding the arm to the pad 110, the camera 130 enables the arm of the robot 120 to move the drone, and re-angle it, such that the grasper on the head of the robot arm can adjust the location and angle of the drone to allow the grasper to take out a battery from the landed drone, and then replace that battery with a full charged battery of the same size and type.

Some embodiments include a battery hub 140 useful in recharging spent batteries. The hub 140 receives a spent battery taken from a drone by a robot 120. The hub then uses a power source to recharge the battery, and finally places the battery in a battery supply storage 150 area. The hub 140 later receives the recharged battery and gives it to the robot 120 for placement in a drone. The battery supply storage 150 may hold multiple drone batteries of different types, typically fully charged and ready to be placed into drones. In some embodiments, another function of the hub to hold a back-up battery for the docking station. In the event of a power outage, the back-up battery will be sufficient for functions such as to land or launch a drone, to extend or retract a landing platform, to retract the arm of a robot 120 to bring a drone battery, and to open or close the enclosure of the docking station. The total ability of the back-up battery depends on its size and configuration, which may be selected by the manufacturer or assembler of a docking station.

In some embodiments, an enclosure 410 encompasses the entire docking station 610. It is like the skin of the station 610. The enclosure 410 may be open when a drone is landing or launching, or may be closed to protect the station 610 against inclement weather, insect, animals, or other possible hazards. In some embodiments, on the top of the enclosure 410, there is a meteorological station that may measure parameters such as temperature, humidity, wind direction and speed, and degree of radiation—such information may be useful, even vital, in managing the landing or launching of drones, also to protect the station itself. In some embodiments, the meteorological station measures conditions only outside the docking station 610, in alternative embodiments it measures conditions both inside and outside the station 610, and in yet other alterative embodiments there is a first meteorological station to measure conditions outside and a second to measure conditions inside the docking station 610.

In some embodiments, the docking station 610 includes, within the station 610, an HVAC sub-system 180 for cooling or heating the inside of the docking station depending on the environment in which the station is operated, where typically a hot environment requires cooling and a cold environment requires heating. However, active operations within the station 610 also generate heat, and that is an additional factor in determining whether the HVAC 180 must generate heat (usually a lower need for heat in times of highly active operation, but possibly a higher need for cold) or cold (usually higher need for cold in times of active operation, but possibly a lower need for heat).

2. Robot

In various embodiments, a grasper is attached at the head of the battery switching robot's 120 arm. The grasper may be two pincers of metal or plastic or other material, aligned parallel to the horizontal plane of the docking station, or perpendicular to the horizontal plane of the docking station, or flexible in that they may be rotated up to 360 degrees. The grasper may be manipulated to reposition the drone on the landing pad 110, both in the x-y-z plane as an angle to the arm of the robot 120. In addition to manipulating the position of the drone, the grasper is also configured to take the battery out of the drone, and to place a new battery into the drone. As part of the operation of taking a battery out, or placing a battery into the drone, or as a preliminary to such operation, the robot has the additional capability of turning the drone on or off, which may be done physically by contact with a switch within the drone, or electronically by sending a message from the robot to the drone. If the drone is to be turned on or off electronically, the signal to do so may come from another transmitter located elsewhere in the station.

3. Image Processing

In various embodiments, the scanning camera 130 with imagine processing capabilities is configured to determine the exact location of the drone on the landing pad 110, and the exact angle of the drone on the landing pad relative to the robotic 120 arm. This information may be conveyed to the robot 120, so that the grasper may both manipulate the position of the drone on the landing pad 110, and replace a battery by removing a battery from the drone or placing a charged battery into the drone.

4. Charging Hub

In various embodiments, the battery charging hub 140 is capable of charging/storing a plurality of drone batteries in parallel, wherein the battery charging hub is integrated with, or is connected to, monitoring circuitry and sensors to determine battery-full status of batteries in the process of being charged. The hub 140 will continue to charge a battery until it is fully charged. Further, the hub 140 may be configured to check the status of stored batteries from time to time, and if a battery has lost part of its capacity due to leakage, to recharge the battery. The hub 140 is not restricted to a single size or type of drone battery, but rather may recharge many different kinds of drone batteries, where said different types of batteries service different types of drones.

In some embodiments, the hub 140 includes, or is connected to, a logic controller that may determine the ideal battery for swapping into a drone, and that may further determine availability of charging ports for batteries that have been taken out of drones and are to be charged in the docking station. The number of drone batteries that may be charged simultaneously is limited only by the number of charging ports within the hub 140.

5. Monitoring System

In some embodiments, the docking station includes a monitoring system to detect the health status of batteries in a drone, and to determine the estimated remaining usage life of batteries in a drone. The monitoring system may include also an alert system to notify the docking station or the drone when a drone battery is approaching the end of its life cycle. In alternative embodiments, a drone may have a monitoring system that monitors the remaining usage life of its batteries, and conveys that information to the docking station via a wireless contact 630.

6. Battery Supply Storage

In some embodiments, there is a battery supply storage 150 area, to enable the storage of drone batteries. These batteries may be fully charged, or less than fully charged and waiting for recharging. The batteries in the storage 150 may be duplicates of the same battery, or may be different types of batteries for different drones. The batteries are placed into the storage 150 by the battery hub 140, and also taken out by the hub 140 for later placement into a drone.

7. Landing Pad

Figure 6:
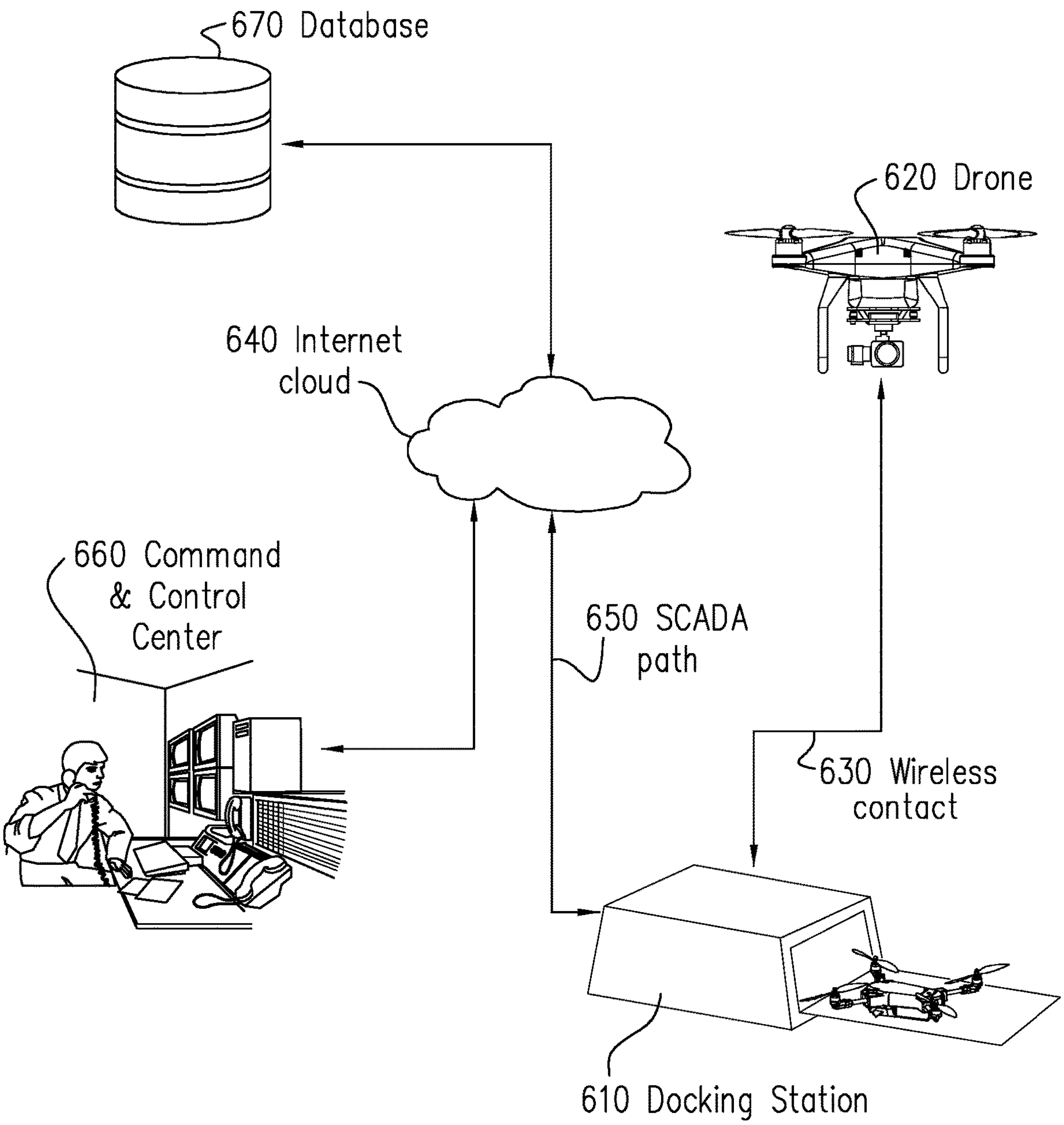
FIG. 6 is a diagram of a system configured for autonomous or semi-autonomous management of switching batteries in a drone, including a docking station, a drone, and a command center communicatively connected to the drone station to enable SCADA operations.

In various embodiments, the drone landing pad 110 is extendable in height. A lift 520 may be extended to raise the landing pad 110 for precision in the landing process of a drone, for achieving the best height of the landing pad during landing or launching to avoid external obstacles, and for repositioning the drone on the landing pad after landing or before launching. FIG. 1 illustrates the landing pad extended in height, with a drone on the pad that has just landed or that is to be launched. When the lift 520 is retracted, the drone goes down to the plane of the docking station, as shown in FIG. 6. In some embodiments, the arm of the battery swapping robot 120 services the drone on the landing pad 110 while the pad 110 is in retracted position at the level of the drone. A robotic arm may be elevated to service the drone at a different elevation that the plane of the station. When a docking station may land and service two or more drones simultaneously, various embodies will allow positioning of the drones one behind the other on the plane of the station (moving from front to back), one beside the other on the plane of the station (moving from side to side), or one above the other where one drone is on the plane of the docking station and another drone is on a higher plane.

8. Lighting Sub-System for Night Operations

In various embodiments, the landing pad 110 includes a lighting sub-system 530 attached to, or in close proximity to, the pad 110. Such a sub-system 530 may be "internal" in that is it attached to the pad 110 as shown in FIG. 5, or it may be "external" in the sense of not being attached to the pad 110 but being in close enough proximity so as to shine its light on the pad 110. The lighting sub-system 530 may be operated when visual conditions for landing a drone are difficult, due to night, inclement weather, or darkness caused by some obstacle. In some embodiments, the lighting sub-system 530 includes circuitry and sensors to determine outdoor lighting conditions related to landing of a drone, or alternatively launching of a drone. The light may be part of the RGB visible spectrum, or infrared, or ultraviolet, or some other frequency of the EM spectrum. In some embodiments, the lighting sub-system 530 may include a logic controller toggle for altering the kind and degree of lighting based on outdoor lighting conditions at the time of landing or of launching a drone.

9. Housing

In various embodiments, the station includes an antenna, or multiple antenna for wireless contact 630 between the station and a drone. These antennas may be located in a dedicated housing 430 within the enclosure 410. This housing 430 may include a plate or window in the enclosure 410, which will allow installation and removal of the antennas. This plate or window will have a remote control antenna port 440, one port for each antenna, in which the antenna extends out of the enclosure in order to enhanced communications between the station and the drone. Various embodiments may also include a device in the docking station for turning on or off a remote controller located inside or outside the station.

10. API-SDK

In various embodiments, the docking station includes an application programming interface (API) that is integrated into the software used in the software of the docking station, and that eases the ability of a third party to integrate its software with the station, and therefore enable more applications to be conducted by and with the station. In various embodiments, the docking station includes a software development kit (SDK), which is one or more pieces of prewritten code that ease the ability of a third party integrate its software with the station, and most particularly enable a third party to quickly and easily integrate its software using the API. In various embodiments, the API and SDK are integrated as one package into the software of the docking station.

11. Back-Up Battery

In various embodiments, the docking station includes a self-initializing back-up battery that detects power loss on the main voltage input source and provides back-up power when needed. This back-up battery may be located as integrated component of the battery supply storage 140, or in alternative embodiments it may be located separately from such storage 140. In various embodiments, the station includes a logic system that alerts a command & control center 660 of a power loss to the station. If the center 660 is wholly autonomous with no human operator, the docking station and the entire system will operate according to previously programmed protocols. If a human is at the center 660, the system is not wholly autonomous, and the human will decide what to do. The back-up battery will supply, at a minimum, enough stored power to ensure the safe return of a drone to the docking station in the event of power loss during a landing operation. In alternative embodiments, the back-up battery may have enough power to launch a drone, or to extend or retract a landing pad or a robot arm, or to operate the entire station for a limited period of time. The back-up battery may be recharged by the battery hub 140 or by another charger.

12. HVAC and Climate Control

In various embodiments, the docking station includes a secure and insulated protective casing, or enclosure 410, providing safe storage for the drone when in the station, and for isolating the station from the outside environment to protect the station. In various embodiments, the docking station also includes monitoring circuitry and sensors to determine climate conditions within the station when it is closed. The docking station may also include an HVAC sub-system to help regulate the temperature of the station, and a logic controller to toggle the HVAC sub-system on and off to thereby maintain the temperature of the docking station within acceptable limits. The docking station may also include a monitoring device to determine if external weather conditions such as wind, rain, humidity, and radiation are suitable for landing and launch operations. In some embodiments, there is a reflective paint coating on the outside of the docking station to repel UV rays, and thus reduce the internal temperature of the docking station.

13. Safety Alarm Sub-System

In some embodiments, the docking station includes a safety alarm sub-system that beeps sound and/or blinks an LED lights 470 as the docking station is in the process of opening or closing.

14. Scanning or Maintenance

In some embodiments, the scanning camera 130 is further configured to inspect a drone and provide an alarm if there is a need for maintenance on the drone, or if the damage to the drone is such that it should be taken out of service. In some embodiments, the scanning camera 130 is further configured to inspect visually the visual mechanical assemblies within the station, and to provide an alarm if there is a need for maintenance of a mechanical assembly.

15. Repellent Sub-System

In some embodiments, the docking station includes a repellent sub-system for repelling bugs or animals. In one form, this sub-system may be a multi-spectral noise generator, with a capability of the generator to modify the spectrum of the noise generated depending on the insects or animals native to the geographical location where the docking station is deployed. In other form, the sub-system may be flashing lights in various frequencies of the EM spectrum. In another form, sub-system may be a noxious smell or gas that is emitted by the station. The sub-system may include one, two, or more of these forms.

16. Power

In some embodiments, the docking station is configured to be powered by either AC or DC current, and in which a source of DC current may be any of an attached battery, a car battery, or a solar cell in proximity to the station. In some embodiments, a docking station may operate while mounted on a vehicle, and in such cases the station may be powered by the vehicle battery. If the vehicle is in motion, then the locking mechanism previously described can lock as to protect the robot.

17. External Station Accessories

In some embodiments, the docking station may include one or more external station accessories, examples of which include, without limitation:

(1) an antenna to an internet cloud 490;
(2) a meteorological station 485;
(3) communication ports 480;
(4) antennas for wireless contact 430 with drones
(5) connectors 450;
(6) external lighting to ease drone landing or drone launching, optionally with different spectrums of light, and optionally with programmable intensity;
(7) an external camera for inspection of the station, safety of the station, and prevention of theft;
(8) an external barrier against strong winds;
(9) an external stand that raises the station, and helps prevent the entry of animals, ground water, dust, and ground bugs.

18. Multiple Piece Configuration

In some embodiments, the docking station comprises two or more separable pieces, allowing for easy and fast assembly, disassembly, and transport.

FIG. 6 is a diagram of a system configured for autonomous or semi-autonomous management of switching batteries in a drone, including a docking station 610, a drone 620, and a command center 660 communicatively connected to the drone station 610 to enable SCADA operations 650. In FIG. 6, the station 610 is in wireless contact 630 with a drone 620, including data from the drone 620 about the status of a mission, live video from the drone's camera or other sensors, transmit data and commands to the drone, the status of a battery within the drone 620, or the status of the drone 620 itself. This wireless contact 630 may be of any basic RF technology, such as frequency division, time division, code division, standard broadcast, direct sequence spread spectrum, frequency hopping, clear transmission, encrypted transmission, or other. The station 610 is also in communicative contact for SCADA operation 650 through an internet cloud 640, that may include command & control software to route messages to and from the drone station. 610. For example, a message may be routed to a database 670 that has information about the type of drone 620 in contact with the station 610, or the mission of the drone 620, or other relevant information. Messages may also be conveyed to the database 670 to update the database 670. The cloud 640 may also direct messages to and form a command & control center 660 that is monitoring the operation, or giving commands to the drone 620 through the station 610, or asking for information from the station 610. The meaning of "SCADA" 650 in this context is manifold—it may mean collecting data from the drone 620 via the station 610 to the database 670 or the command & control center 660, or sending data to the drone 620 through the station 610, or conveying some command from the command & control center 660 through the cloud 640 to either the station 610, or to the drone 620 via the station. The command & control center 660 may be fully automated, with no direct human involvement. Or conversely, the center 660 may have a human operator making inquiries, or reviewing data, or issuing command, in which case the system is set to be operating "semi-autonomously", in which the either the station may give some commands such as, for example, to give a command to fly to a certain point in the map, to control the drone's external lighting, to activate drone sounds, or to give another possible command. In alternative embodiments of such semi-autonomous operations, the drone itself, having receive a mission, will then actions to achieve the mission such as flying to a certain point in the map, to operate the drone's external lighting, to activate drone sounds, to take another possible action.

One embodiment is a system for managing the rapid replacement of batteries on drones with charged batteries that are matched to be used by particular drones. A drone docking station 610 is configured to identify a specific drone 620 in one or more of multiple ways, such as, for example, by knowing the battery type in the drone, or by visual identification by the camera 130 of the station. The docking station 610 may also be configured also to replace rapidly the drone's battery with a charged battery of the same type. The battery to be placed in need not be an exactly duplicate of the battery taken out. It may be a duplicate, or it may be a battery by a different manufacturer or even with some electro-mechanical differences, provided that the physical size is the same so that the new battery will fit inside the drone, and that the essential electrical properties for the new battery to work (such as type of battery, voltage, capacity, energy density, temperature range of operation, and other) are the same for both batteries. The system for identifying and replacing batteries may be controlled by a software at a command & control center 660. The center 660 receives data via a drone station 610 and may also issue commands to the docking station 610 or to the drone 620 via the docking station 610, all of this managed by the software at the center 660, or autonomously in the station 610. The communication between the center 660 and the docking station 610 is via a SCADA path 650, which is a communication path that may be wireless or wireline of any kind. The term "SCADA" in this context means two-way communication, including "data acquisition" from the station 610 to the center 660, and "supervisory control" from the center 660 to the station 610. Part of the data acquired may be update reports from specific drones about the status of drones, or the status of missions, convey from the drone 620 to the station 610 and then to the center 660. The communication line may be a dedicated line between the center 660 and the station 610. In other embodiments, both the center 660 and the station 610 are connected to an internet cloud 640, such that the communication lines between the center 660 and the station 610 are public rather than private or dedicated. Communication between the center 660 and the station 610 may be clear or encrypted, but encryption is more suited in some embodiments where public lines are used. Similarly, the wireless contact 630 between a station 610 and a drone 620 may be clear or encrypted.

A system for managing drones may include multiple docking stations and multiple drones, all communicating with a command & control center 660. In some embodiments, a single station 610 may maintain wireless contact 630 with a multiplicity of drones. The system may also have a database 670 with information about specific drones, specific docking stations, batteries, missions, and anything related to the functioning of the system. That may be true in particular where the system includes multiple docking stations and multiple drones. In some embodiments, the database 670 receives updated reports from specific drone docking related to the ongoing status of specific drones, including the drones themselves, their batteries, and their missions. In some embodiments, the database 670 may have a dedicated communication path to one or more docking stations. In alternative embodiments, both the database 670 and the docking stations are communicatively connected to an internet cloud 640, in which case the communication paths are public rather than dedicated. In some embodiments, the database 660 and the command & control center 660 are co-located at the same place, whereas in others they are separate. There may be a back-up database in addition to the original database 670, where the back-up may be updated either simultaneously with the original database 670, or after the update to the original database 670. Similarly, there may be a back-up to the command & control center 660, in case of center failure.

In some embodiments, the command & control center 660 is fully automated, without human involvement. Commands are created by the center 660 according to algorithms that have been programmed into the center 660. Similarly, the algorithms determine how the center 660 will process and interpret data coming in from docking stations and drones. The center 660 may draw upon the data stored in the database 670.

In some embodiments, the command & control center 660 is not fully automated, but is rather manned by one or more persons. It is that person, then, who interprets incoming data and who determines the commands to issue, though he may be aided by algorithms such as analytics that have been programed into the center. The center 660 may draw on the data stored in the database 670. The human operator may also make request to receive data from the database 670.

Figure 7:
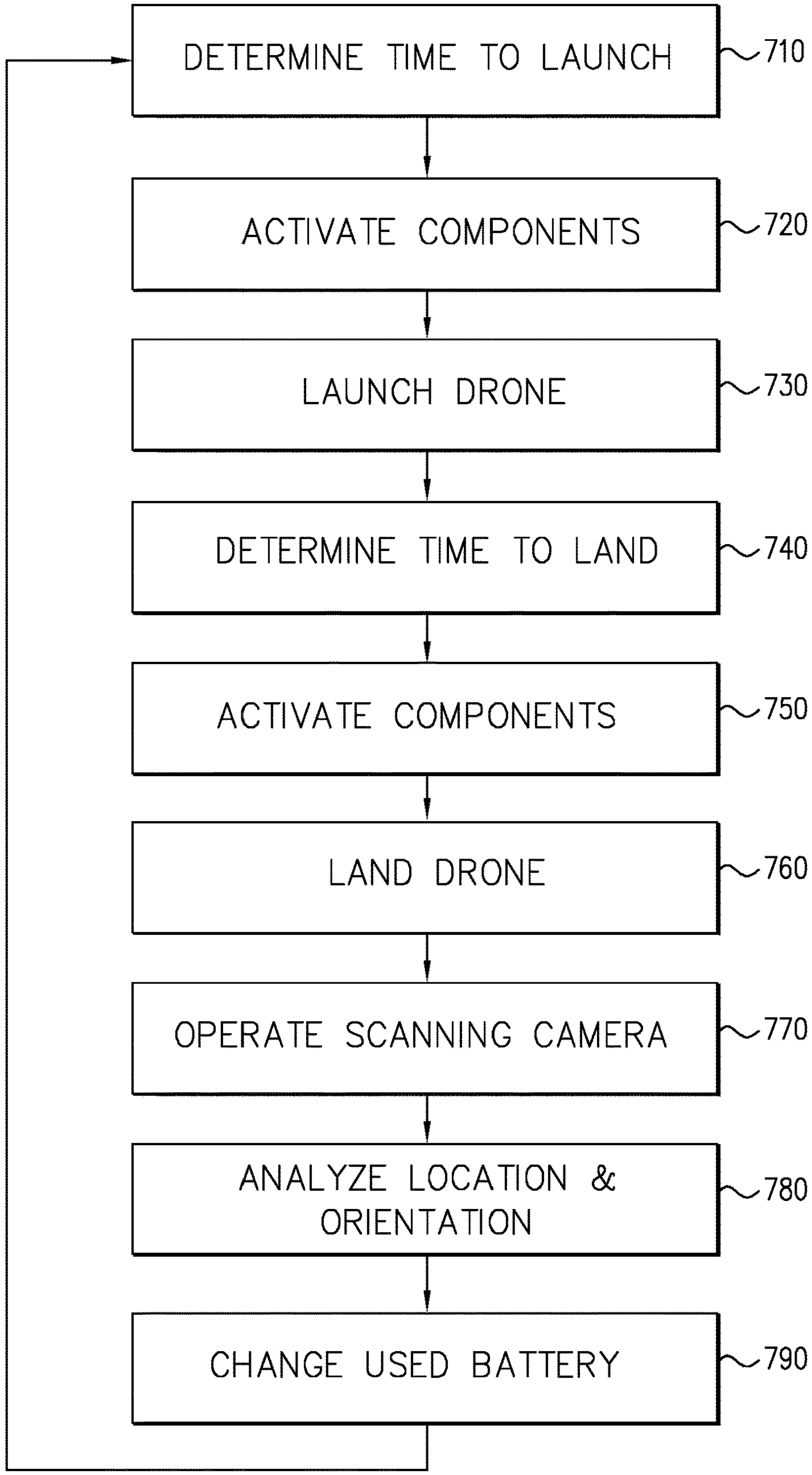
FIG. 7 is a diagram of a method for launching and landing drones on a landing pad, including automated changing of a used battery with a fully charged battery.

FIG. 7 is a diagram of a possible method for launching and landing drones on a landing pad, including automated changing of a used battery with a fully charged battery. The method illustrated in FIG. 7 is a cycle of launch, fly, land, battery swap, launch, etc. Therefore, many points in the cycle could be considered the "starting point." For present purposes, assume the start of the cycle is when the system determines that a time has come to launch a drone 710. This decision may have been made at a command & control center 660, which may be manned or unmanned. If manned, the system and the method are said to be "semi-autonomous." If unmanned, the system is "autonomous." "Autonomy" is a relatively flexible term, but in art it often refers to the four levels of machine autonomy, which are:

Level I: Platform controlled by a human. Here, all commands to the station and the drone would be from human operators. There is no machine autonomy. Classic examples are automobiles and guns, which do only what the human orders.

Level II: Platform is authorized by a human. For example, drone launch with a preset plan and no autonomy of operation or decision. Machine autonomy is minimal. An example is a self-moving vacuum cleaner, which, once turned on, simply performs its task, with no intervention by a human unless a problem arises.

Level III: Platform is supervised by a human, but the platform may operate independently unless the human intervenes. Here there is potentially substantial autonomy. An example is remotely piloted vehicles which are aware of obstacles and avoid them.

Level IV: Platform is independent. A human sets the target or goal, and then there is no more human involvement. Even if a problem arises, the system is programmed to decide and operate independently in pursuit of some pre-defined goal. Machine autonomy is maximal. An example is a search & destroy robot.

The docking stations and drones described herein can operate at any level of autonomy, from I to IV. That is true of every command portrayed in FIG. 7. Before 710, either the system or a person has determined a goal or objective, and created a plan to achieve it. Then in 710, the decision is made to launch a drone that is currently stored on a landing pad or within the docking station.

In 720, system components are activated as preparation to launching the drone. If the drone's battery is run down, it will be replaced. If there is damage to a drone, it may be repaired or a different drone may be selected for the mission. A charged and repaired drone will then be placed of the landing pad, and the landing pad will then be extended out of station, and lifted up for launch. If any air protocols, passwords are to be set, now is the last opportunity to do so. If data exists about the type of drone and its condition, or the type of drone battery and its condition, all of that is conveyed prior to launch. If the drone needs a map to the target area, that will be provided. If the drone must deliver something, be it a package or other, that will be loaded onto the drone. Similarly, for any sensory equipment that the drone requires, it will be loaded onto the drone prior to launch.

After all is ready, the drone is launched 730. Again, the decision to launch may be autonomous without people, or decided by the system based on pre-determined criteria. The drone will then fly to the target and perform whatever mission with which it was charged. Depending on the degree of machine autonomy in this mission, the drone may or may not remain in contact with the docking station, then through the station to a network control center.

After completion of the mission, or due to the state of the drone and its battery, a decision may be made that the drone must land 740, for battery replacement or for decommissioning for a time, or for any other reason. Determining to land 740 is followed by activating components 750 required for a successful landing. Again, the landing platform may be extended up and out to prepare for landing. The robot may retrieve a fully charge battery from storage to be placed into the drone. The database affiliated with this drone will be updated by a report from the drone. Again, the system knows what kind of drone is about to land, what kind of battery that drone needs, and the current status of both the drone that is about to land and its battery. The drone then lands on the landing pad 760.

After the done is on the landing pad, the docking station must determine the exact location of the drone on the pad. It will also need to know the exact angle of the drone on the landing pad relative to the arm of a robot that is being extended from the center of the docking station toward the drone. These measurements of the location and angle of the drone on the landing pad are taken by a scanning camera that operates 770 according to either pre-programmed instructions or a command from the station, from the unmanned control center, or from a human at the control center, and by special software analyzing the image of the drone taken by the scanning camera, in order to identify all the details about the landed drone.

The special software on the camera then uses analyzes the information 780 about the landed drone to determine the exact location of the drone on the landing pad, and also the orientation of the drone on the landing pad in relation to the robotic arm. (In this sense, "reorientation" means changing the angle of the drone on the landing pad in relation to the robotic arm, so that the grasper of the robotic arm will be able to change the battery.) The software also determines if there is a need to reposition the drone on the landing pad in order to allow the grasper to change the battery of the drone.

The robotic arm will then move towards the drone on the platform, in order to change the battery 790. If the analysis of the software showed that there was a need to relocate or reorient the drone on the landing pad, then the grasper will take hold of the drone and perform the relocation or reorientation. In this process, the robotic arm and grasper will be guided by the scanning camera. If the analysis showed there was no need for relocation or reorientation, or if there was a need and the change has been made, then the grasper will change the used battery 790 of the drone. The robotic arm will first turn off the drone's power, then take out the used battery, and then replace the taken out battery with a fully charged replacement that is identical in relevant specifications with the battery that was taken out. In some embodiments, the robotic arm has two graspers, one to take out the used battery from the drone, and a second one that is holding the replacement battery and that then places the replacement battery in the drone. The grasper holding the used battery will then bring that battery back to the battery hub where it will be recharged and stored in a battery supply storage for later use.

In other embodiments, the robotic arm has one grasper, so that the actions described above for changing the used battery 790 will be seriatim rather than in parallel. After the robotic arm has repositioned the drone on the landing pad, if that is necessary, the grasper will then take out the battery. The arm will retract and will give the used battery to the battery hub which will recharge and store it. After giving the used battery to the battery hub, the robotic arm will receive from the battery hub a fully charged battery identical in relevant specifications to the battery that was extracted. The robotic arm will then extend outward toward the drone on the landing pad, and will place the charged battery into the drone. The drone will then be ready either for launch, or to be taken inside the docking station for refit or for storage until another mission arises.

In alternative embodiments of FIG. 7, the docking station will have more than one landing pad, which means that it can land together, or launch together, or both land and launch, essentially simultaneously if there are separate robotic arms for each landing pad. If, alternatively, there is one robotic arm for two or more landing pads, then launch and land may be done simultaneously, but battery replacement must be seriatim, one drone after another, which may be performed according to the time priority of the landing drones, or according to any other priority of service as determined by the system, such as, for example, the current state of the drones, or the relative importance of missions, or other.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the FIG.s may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A docking station configured for semi or fully autonomous management of drones, comprising:

a. a landing pad, wherein the landing pad is extendable in height for achieving an optimal height of the landing pad during landing or launching of a drone, and for repositioning the drone after landing or before launching, and wherein the landing pad comprises a lighting sub-system that includes (i) circuitry and sensors to determine outdoor lighting conditions, (ii) lighting capabilities for night operations, and (iii) a logic controller toggle for altering a kind and degree of lighting based on the outdoor lighting conditions;

b. a robot comprising a robotic arm that is capable of swapping batteries in the drone, wherein the robot is configured to move within the docking station on x-y-z axes, wherein the robot further comprises a grasper that is configured to reposition the drone on the landing pad on the x-y-z axes, and wherein the robot has capabilities to turn the drone on or off, to remove a depleted battery from within the drone, and to place a charged battery into the drone;

c. a camera with image processing capabilities to determine a location of the drone on the landing pad and an angle of the drone on the landing pad relative to the robotic arm;

d. a battery hub configured to charge a plurality of drone batteries in parallel, wherein the battery hub comprises monitoring circuitry and sensors to determine a charge status of the plurality of drone batteries;

e. a battery logic controller to determine the charged battery to swap into the drone and to determine an available charging port for the depleted battery;

f. a battery monitoring system to determine a health status and an estimated remaining usage life of each of the plurality of drone batteries, wherein the battery monitoring system comprises an alert system to notify when one of the plurality of drone batteries is approaching a life cycle end;

g. a battery storage to enable storage of the plurality of drone batteries;

h. an enclosure for operations in inclement weather;

i. a weather station to monitor weather conditions both outside and inside the docking station;

j. an HVAC sub-system;

k. a dedicated housing for a drone remote controller with access for installation and removal;

l. An antenna for communicating wirelessly between the docking station and the drone;

m. an antenna mounting hole that allows for external positioning of the antenna; and n. a toggle device for turning the drone remote controller on or off.

2. The docking station of claim 1, further comprising an integrated API and an integrated SDK to allow for rapid 3rd party software integration.

3. The docking station of claim 2, further comprising:

a. a self-initializing back-up battery that detects power loss on a main voltage input source and provides back-up power when needed; and b. a logic system that alerts a remote operator in the case of power loss to the station, wherein the back-up battery will supply enough stored power to ensure the safe return of the drone to the docking station in the event of power loss during a landing operation.

4. The docking station of claim 3, further comprising:

a. a secure and insulated protective casing providing safe storage for the drone when in the docking station;

b. monitoring circuitry and sensors to determine internal climate conditions;

c. a logic controller to toggle the HVAC sub-system on and off to thereby maintain the temperature of the docking station within acceptable limits; and d. a reflective paint coating on the outside of the docking station to repel UV rays, wherein the weather station is configured to determine if external weather conditions such as wind, rain, humidity, and radiation are suitable for landing and launching operations.

5. The docking station of claim 4, further comprising a safety alarm sub-system that beeps sound or blinks an LED light as the docking station is in the process of opening or closing.

6. The docking station of claim 5, wherein the camera is further configured to inspect the drone and provide an alarm if there is a need for maintenance; and is further configured to visually inspect mechanical assemblies within the station and to provide an alarm if there is a need for maintenance.

7. The docking station of claim 6, further comprising a repellent sub-system for repelling bugs or animals, with a multi-spectral noise generator, with a capability of the generator to modify a spectrum of noise generated depending on particular insects or animals native to a geographical location where the docking station is deployed.

8. The docking station of claim 7, in which the docking station is configured to be powered by either AC or DC current, and in which a source of DC current may be any of an attached battery, a car battery, or a solar cell in proximity to the station.

9. The docking station of claim 8, further comprising one or more external station accessories selected from a group of accessories consisting of external lighting in different spectrums or different intensity for ease of drone landing; an additional camera for station inspection, safety, and prevention of theft; an external barrier against strong winds; and an external stand above the ground to prevent entry of animals, ground water, dust, and ground bugs.

10. The docking station of claim 8, comprising two separable pieces, one piece comprising the landing pad, and the other piece consisting of the other components of the station, where in the two pieces may be easily assembled or disassembled for each of installation or movement.

* * * * *